United States Patent [19]

Takahashi et al.

[11] Patent Number: 5,105,760
[45] Date of Patent: Apr. 21, 1992

[54] APPLICATOR DEVICE FOR APPLYING THIN LIQUID FILMS ON CARRIERS

[75] Inventors: Shinsuke Takahashi; Norio Shibata, both of Kanagawa, Japan

[73] Assignee: Fuji Photo Film Co., Ltd., Kanagawa, Japan

[21] Appl. No.: 684,725

[22] Filed: Apr. 15, 1991

[30] Foreign Application Priority Data

Apr. 16, 1990 [JP] Japan .................................. 2-97705

[51] Int. Cl.$^5$ .............................................. B05C 5/02
[52] U.S. Cl. ................... 118/410; 118/411; 118/419; 427/356
[58] Field of Search .................. 118/410, 411, 419; 427/356, 357, 358

[56] References Cited

U.S. PATENT DOCUMENTS

| | | | |
|---|---|---|---|
| 4,299,186 | 11/1981 | Pipkin et al. | 118/410 |
| 4,424,762 | 1/1984 | Tanaka et al. | 118/410 |
| 4,445,458 | 5/1984 | O'Brien | 118/410 |
| 4,537,801 | 8/1985 | Takeda | 118/410 |
| 4,854,262 | 8/1989 | Chino et al. | 118/411 |

*Primary Examiner*—Michael G. Wityshyn
*Attorney, Agent, or Firm*—Sughrue, Mion, Zinn, Macpeak & Seas

[57] ABSTRACT

An extrusion-type applicator device continuously applying a liquid to a carrier film moving with a predetermined linear velocity and a predetermined running direction includes a head having a bore disposed parallel to the axis of the head for receiving the liquid, a slot connecting the bore with a surface of the head, a back edge portion disposed adjacent to the slot on the upstream side of the slot and having a chamfer whose width is less than or equal to about 50μm but larger than the diameter of each grain of the material of the back edge portion, and a doctor edge portion disposed adjacent to the slot on the downstream side of the slot with respect to the direction, the doctor edge portion having a chamfer with a width of about 2 to 3 μm provided at the upstream edge of the surface of the doctor edge portion. The applicator device can be modified to simultaneously apply a plurality of liquids to a carrier to produce a plurality of films thereon. The modified applicator device includes a second slot disposed between the slot and the chamfer of the back edge portion.

7 Claims, 3 Drawing Sheets

APPLICATOR DEVICE FOR APPLYING THIN LIQUID FILMS ON CARRIERS

FIELD OF THE INVENTION

The present invention relates generally to an applicator device. More specifically, the present invention relates to an improved extrusion head having a doctor edge portion in the outlet part of the head so that a liquid which is continuously pushed out toward the surface of a running carrier, is applied with a uniform thickness to the surface of the carrier through the action of the doctor edge portion. According to one aspect of the present invention, the applicator is particularly useful for applying thin liquid films to carriers moving at high linear speeds.

BACKGROUND OF THE INVENTION

Various types of applicators are known. One of these applicator devices is an extrusion-type applicator, which has a doctor edge portion and which is used in various fields such as those mentioned in the Japan Patent Applications (OPI) Nos. 138036/75, 84771/82 and 104666/83 and Japan Patent Application No. 7306/78. (The term "OPI" as used herein means an "unexamined published application.") However, these extrusion-type applicators have a common disadvantage in that each of the devices has only a very narrow operating range providing proper application. For example, it is very difficult to repeatedly perform the application of an applied liquid film having a thickness of 20 micrometers ($\mu$m) or less, particularly when the linear speed of the carrier is greater than 100 to 150 meters per minute (m/min). In these applicators, the quantity of air which is entrained between the applicator head and the running carrier increases sharply as the speed of application is increased. In order to apply a liquid uniformly in the form of a thin film on the carrier when the speed of application is greater than 100 to 150 m/min., the pressure of the liquid at the outlet portion of the slot of the applicator head, or a similar opening, needs to be increased appropriately in order to avoid the adverse effects of air entrainment. Therefore, if the pressure of the liquid cannot be made high enough, the thickness of the applied liquid film becomes nonuniform due to the mixing of air bubbles into the film.

Japan Patent Application (OPI) No. 10466/83 discloses an applicator shown in FIG. 6, which was proposed in an attempt to increase the pressure of a liquid during the application period to increase the speed of application without allowing the thickness of the applied liquid film on the carrier to become nonuniform in the direction of the width of the carrier. Since the pressure of the liquid can be made high locally at the surface of the slot edge of the doctor edge portion of an applicator head and kept relatively uniform, air is prevented from entering the applied liquid film from the surface of the carrier at the back edge portion of the head, which makes it possible to rapidly apply the liquid to the carrier, thus creating a thin film having a uniform thickness.

However, making the speed of application high while simultaneously making the pressure of the liquid high, as discussed above, results in a problem in that the edge portion of the applicator head is likely to be chipped. It will be appreciated that this causes very serious defects in the applied liquid film on the carrier such as streaks To cope with this problem, the applicator disclosed in the Japan Patent Application No. 85672/89 was proposed. This applicator head is made of a material less likely to be chipped even when the pressure of the applied liquid is high or when the linear speed of the carrier is high. Therefore, the possibility of a defect in the applied liquid film is lowered to some extent.

However, when the applied liquid is a magnetic liquid in which a ferromagnetic iron oxide powder or other abrasive grains are dispersed, when the speed of application is very high and when the thickness of the applied liquid film is small, the pressure effects and abrading action of the powder or grains during application of the liquid film have made the problem more conspicuous.

The applicator disclosed in the Japan Patent Application (OPI) No. 35959/90 includes a sloping plane, having a relatively large width of 0.01 to 1 millimeter (mm) on the doctor edge portion of the applicator head, on the upstream side of the portion with respect to the running direction of the carrier, for the purpose of preventing extraneous substances from being trapped on the portion. Although the purpose is achieved, the device is not effective in solving the chipping problem discussed above. Therefore, when a liquid is applied continuously to the carrier by the device at a high speed for a long time period, a streak is made on the surface of the applied liquid film on the carrier. It will be apparent that this adversely affects the signal-to-noise ratio or carrier-to-noise ratio of a magnetic recording medium manufactured from the liquid and the carrier.

The present invention was motivated by a desire to solve this problem.

SUMMARY OF THE INVENTION

The principal purpose of the present invention is to provide an extrusion-type applicator capable of applying a liquid to a carrier at a high speed without streaks in the applied liquid film.

Another object of the present invention is to provide an applicator device which is resistant to chipping so as to prevent streaks on the surface of the thin film of the applied liquid on the carrier.

Still another object of the present invention is to provide an applicator device for applying a thin liquid film to the surface of a carrier moving at a high linear speed to produce a film layer of high quality.

These and other objects, features and advantages of the present invention are provided by an extrusion-type applicator device for continuously applying a liquid to a carrier film moving with a predetermined linear velocity and having a predetermined running direction, the applicator device including a head having a bore disposed substantially parallel to the longitudinal axis of the head for receiving the liquid, a slot operatively connecting the bore with a surface of the head opposing the carrier, the slot having opposing surfaces defining a substantially rectangular passage for the liquid, a back edge portion disposed adjacent to the slot on the upstream side of the slot with respect to the direction, the back edge portion having a chamfer whose width is less than or equal to about 50 $\mu$m and larger than the diameter of each grain of the material of the back edge portion, and a doctor edge portion disposed adjacent to the slot on the downstream side of the slot with respect to the direction, the doctor edge portion having a chamfer with a width of about 2 to 3 $\mu$m provided at the upstream edge of the surface of the doctor edge portion.

According to one aspect of the present invention, the applicator device simultaneously applies a plurality of liquids to a carrier to produce a plurality of films thereon. The applicator device provides the doctor edge portion for applying a second liquid to the carrier so that the second liquid makes an upper film on a lower film thereon and has the chamfer with a width of about 2 to 3 μm provided at the upstream edge of the surface of the portion with respect to the running direction. The applicator device includes a second slot disposed between the slot and the chamfer of the back edge portion.

These and other objects, features and advantages of the invention are disclosed in or apparent from the following description of preferred embodiments.

BRIEF DESCRIPTION OF THE DRAWINGS

The preferred embodiments are described with reference to the drawings, in which like elements are denoted throughout by like or similar numbers, and in which.

DESCRIPTION OF THE PREFERRED EMBODIMENTS

The present invention resulted from intensive studies, which indicated that a delicate combination of the structure of a doctor edge portion at the edge of the carrier-facing surface at a slot and the structure of a back edge portion at the downstream edge of the carrier-facing surface with respect to the running direction of a carrier, effectively prevents the portions from being chipped.

The extrusion-type applicator according to the present invention continuously pushes out the liquid from the outlet portion of a slot to the surface of the flexible carrier being continuously run along the surface of a back edge portion and that of a doctor edge portion, so that the liquid is applied to the surface of the carrier The device is characterized in that the doctor edge portion has a chamfer which is provided at the upstream edge of the surface of the portion with regard to the direction of the running of the carrier and is 2 to 3 μm in width; and the back edge portion has a chamfer which is provided at the downstream edge of the surface of the portion with regard to the direction and whose width is 50 μM or less but larger than the diameter of each grain of the material of the portion.

Preferably, each flexible carrier mentioned above is a flexible sheet such as a plastic film, paper, polyolefin-coated paper or a metal sheet, i.e., aluminum, copper or the like. The carrier can advantageously be provided with an undercoat layer or the like. Various liquids such as a magnetic liquid or a photographic photosensitive liquid can be applied to the carrier to manufacture a magnetic recording medium, a photographic film, printing paper other film-coated products.

An embodiment of the present invention is hereafter described in detail with reference to the drawings attached hereto.

Figure 1:
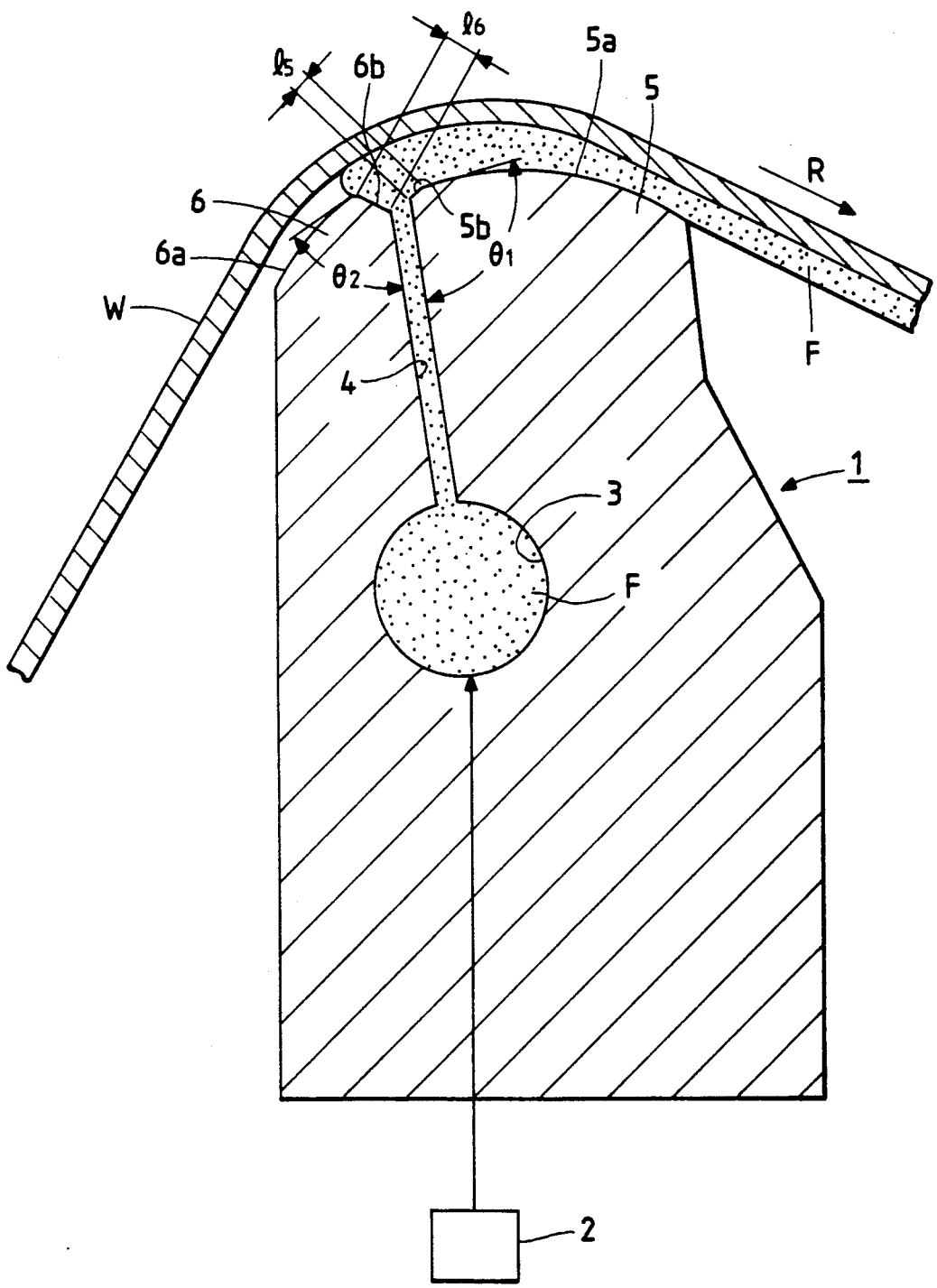
FIG. 1 is a sectional view of the extrusion head of an applicator according to the present invention.

FIG. 1 is a sectional view of an extrusion head 1 of an extrusion-type applicator according to a preferred embodiment of the present invention, which shows the device applying a liquid F to a carrier W. The extrusion head 1 includes a pocket 3, a slot 4, a doctor edge portion 5 and a back edge portion 6. Extrusion head 1 is connected to a liquid feed line 2, which advantageously provides liquid F to pocket 3. The liquid feed line 2 includes a positive displacement liquid feed pump, not shown in the drawings and provided outside the body of the extrusion head 1, so as to continuously supply the liquid F at a constant flow rate to the body, and a pipe for connecting the pump to the pocket 3 extending through the body parallel to the width of the carrier W. The pocket 3 is a reservoir whose cross section is nearly circularly shaped throughout the total length of the body of extrusion head 1 along the width of the carrier W. The effective length of the pocket 3 is set to be equal to or slightly greater than the width of carrier W to which liquid is applied.

Figure 2:
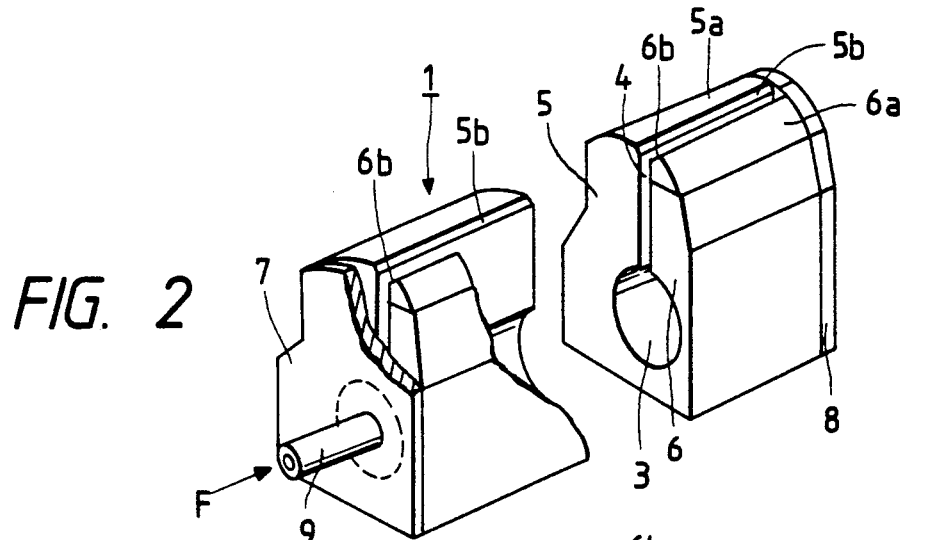
FIG. 2 is a cutaway perspective view of the extrusion head illustrated in FIG. 1.

Referring to FIG. 2, openings at both the ends of the body, to which the pocket 3 extends, are closed by seal plates 7 and 8 attached to the ends. The liquid feed line 2 is connected to a short pipe 9 projecting from the seal plate 7, to supply and fill pocket 3 with the liquid F. The liquid F is then discharged from the body of the extrusion head 1 through the slot 4 and advantageously has a uniform pressure distribution pushing against the carrier W. The slot 4 is a relatively narrow passage having a width of about 0.03 to 2.0 mm and extending from the pocket 3 toward the carrier W along the entire the width of the carrier W as well as the pocket 3. The length of the slot 4 at the edge portions 5 and 6 and along the width of the carrier W is approximately equal to the width of the liquid-applied portion of the carrier W. The depth of the slot 4, which extends from the pocket 3 toward the carrier W, advantageously can be set based on the composition, physical properties, flow rate and pressure of the liquid F so that the liquid F flows through slot 4 from the pocket 3 in a laminar layer with a uniform flow rate and a uniform pressure distribution along the width of the carrier.

The doctor edge portion 5 and the back edge portion 6 are located downstream and upstream, respectively, of the outlet portion of the slot 4 with respect to the running direction of the carrier W. The carrier facing surface 5a of the doctor edge portion 5 advantageously is curved from the upstream edge of the surface to the downstream edge thereof. The doctor edge portion 5 includes a chamfer 5b abutting the upstream edge of the carrier-facing surface 5a of portion 5 and located at the outlet end of slot 4. Preferably, chamfer 5b extends along the total length of the doctor edge portion 5 for at least the width of the carrier W. The width of the chamfer 5b advantageously is 2 to 3 μm. The back edge portion 6 includes a chamfer 6b at the downstream edge of the carrier facing surface 6a of the portion 6 and adjacent to the edge of the outlet end of the slot 4. Preferably, chamfer 6b extends along the entire length of the back edge portion 6 for at least the width of the carrier W. The width of the chamfer 6b advantageously is 5 to 50 μm. Preferably, the physical angle $\theta_1$ formed by the outlet portion of the slot 4 and the carrier-facing surface 5a of the doctor edge portion 5 is $\theta_1 \geq 80°$. Preferably, the physical angle $\theta_2$ formed between the outlet portion of the slot 4 and the carrier-facing surface 6a of the back edge portion 6 is $\theta_2 \leq 60°$. The effective width of the carrier-facing surface 5a of the doctor edge portion 5 along the running direction of carrier W is about 0.5 to 17.0 mm, when measured as a straight line between the upstream and downstream edge surfaces. The effective width of the carrier-facing surface 6a of the back edge portion 6 along the running direction of carrier W is about 0.1 to 50 mm. The carrier-facing surface 6a of the back edge portion 6 can be either flat or slightly curved. Although the carrier-facing surface 5a of the doctor edge portion 5 is a curved surface in this embodiment, the surface advantageously can be a flat surface, a combination of plural flat surfaces or a combination of a flat surface and a curved surface.

The extrusion-type applicator head 1 constituted as described above is moved by an extrusion head support mechanism (which is not shown in the drawings) so that the head is placed near the carrier W, which is supported on running guide means, such as guide rollers (not shown), so as to have nearly constant tension between the running guide means and be capable of being slightly curved in the direction of the thickness of the carrier W. Therefore, the carrier is curved so that at least one portion of the carrier W is approximately parallel with each of the carrier-facing surfaces 5a and 6a of the doctor edge portion 5 and the back edge portion 6, as shown in FIG. 1. After the liquid feed line 2 has begun to supply the liquid F at a desired flow rate, the liquid flows through the pocket 3 and the slot 4 so that the liquid is pushed out from the outlet portion of the slot, with a uniform flow rate and a uniform pressure distribution along the width of the carrier W. Since the forms of the carrier-facing surfaces 5a and 6a of the edge portions 5 and 6 are prescribed as described above, the pressure of the liquid F pushed out from the outlet portion of the slot 4 is advantageously controlled so that air is prevented from being entrained into the liquid by the carrier W being continuously run in the direction shown by an arrow R in FIG. 1. The liquid F moves onto the carrier W while making a minute gap between the surface of the carrier W and the carrier-facing surfaces of the edge portions, thus pushing the carrier W and the carrier facing surface of the doctor edge portion apart. The surface of the carrier W and the entire carrier-facing surface 5a of the doctor edge portion 5 are completely separated from each other by a predetermined gap by the liquid F moving in the form of a thin film along the total width of the carrier W.

It is preferable for the prevention of chipping of the doctor edge portion 5 that the width $l_5$ of the chamfer 5b is made as large as possible. However, if the width $l_5$ were larger than the above-mentioned angle, the outflow of the liquid F from the slot 4 onto the doctor edge portion 5 would likely be disturbed. In particular, the flow of the liquid F would be likely to be affected more near or at the outside edge of the film of applied liquid F on the carrier W than near or at the interior surface of the film, thus deteriorating the quality of the outside portions of the film in addition to the deterioration of the quality due to the chipping. If the width $l_5$ were smaller than the range discussed above, the doctor edge portion 5 would be chipped due to the load during long periods of use, even though edge portion 5 generally has an obtuse angle between the mutually adjacent surfaces thereof so as to be relatively strong against the chipping. If the width $l_6$ of the chamfer 6b of the back edge portion 6 were smaller than the above-mentioned range, i.e., smaller than the diameter (about 5 $\mu$m) of each crystal grain of a carbide, such as a tungsten carbide, which is a very hard alloy, it would be not only impossible to make the properties of the surface of the chamfer good enough but also the back edge portion would be likely to be chipped to become incapable of being used for a long period, because the angle between the mutually adjacent surfaces of the portion 6 at the downstream edge thereof is an acute angle. If the width $l_6$ of the chamfer 6b were larger than the above-discussed range, the action of the portion 6, which is to pull the liquid F in the reverse running direction of the carrier W, would be so excessively strong as to make the thickness of the film of the applied liquid F on the carrier W nonuniform, causing air to be entrained into the liquid F in the worst case.

The distance between the carrier W and the carrier-facing surface 5a of the doctor edge portion 5, which are separated from each other by the liquid F, is determined in terms of predetermined factors such as the tension of the carrier and the quantity of the supplied liquid. By altering the quantity of the supplied liquid F, the distance can be very easily and accurately set at a desired value, which advantageously is equal to the thickness of the film of the applied liquid F on the carrier W.

The doctor edge portion 5 and the back edge portion 6 advantageously can be made of a very hard alloy or a ceramic to increase the degrees of rectangularity and flatness of the portions to make the above-mentioned distance more uniform along the width of the carrier W, namely, make the thickness of the film of the applied liquid more uniform, and render the rapid applying property and thin film applying property of the applicator better.

Figure 3:
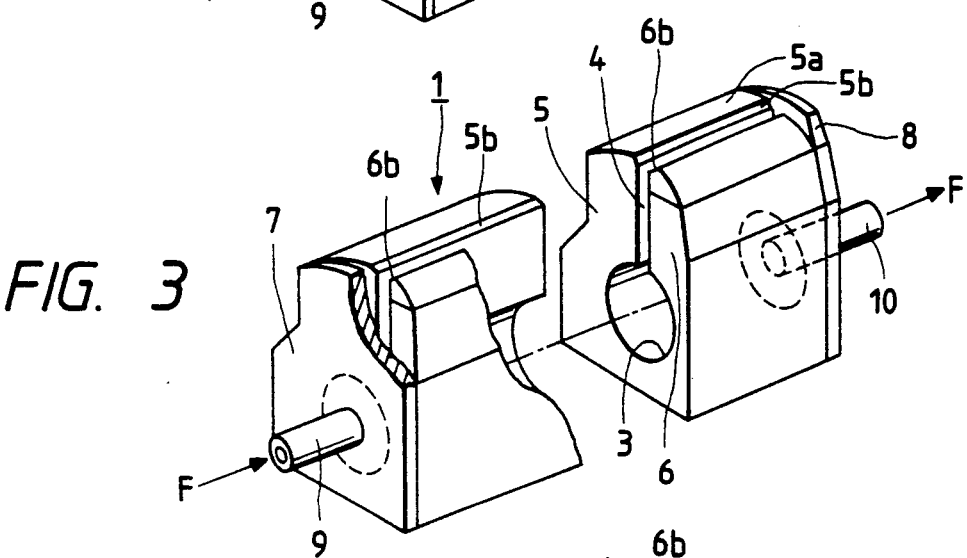
FIGS. 3 and 4 are perspective views showing modifications of the device shown in FIG. 1 including connections for extrusion head liquid feed systems.
Figure 4:
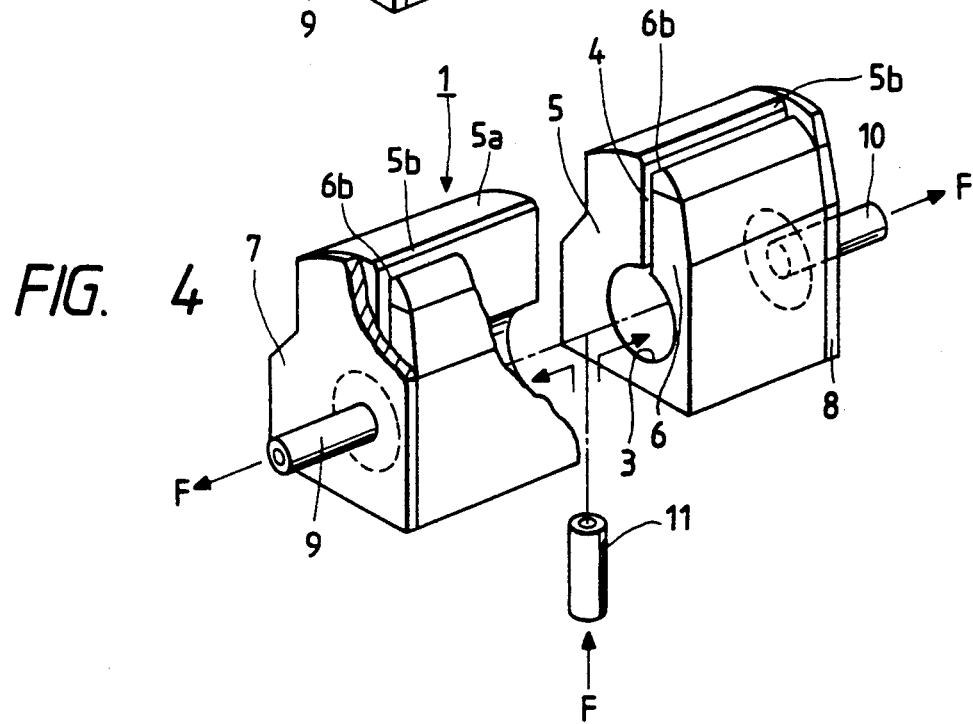

FIGS. 3 and 4 show liquid feed systems which are modifications of the applicator for supplying liquid F to the pocket 3. In the liquid feed system shown in FIG. 3, the liquid F is supplied to the pocket 3 at one end thereof through the short pipe 9 similar to that in the system shown in FIG. 2, but another short pipe 10 is attached to the seal plate 8 so that a portion of the liquid supplied into the pocket through the short pipe 9 at the other seal plate 7 is drained through the short pipe 10 to prevent the liquid from stagnating in the pocket 3. Therefore, the liquid feed system shown in FIG. 3 is very effective particularly for a magnetic liquid having thixotropy and likely to cohere.

In the liquid feed system shown in FIG. 4, short pipes 9 and 10 are attached to the seal plates 7 and 8, and another short pipe 11 is attached to the body of the extrusion head 1 and communicates with the central portion of the pocket 3 so that the liquid is supplied into the pocket through the central short pipe 11, and a portion of the liquid in the pocket is drained therefrom through the lateral short pipes 9 and 10. The rest of the liquid does not stagnate in the pocket 3, and is pushed out from the slot 4, which allows the distribution of pressure in the liquid to be more uniform.

The liquid feed system of the applicator 1 is not confined to any particular embodiment, such as those shown in FIGS. 2, 3 and 4, but may be any appropriate combination of them. The cross section of the pocket 3 is not confined to a circular shape as described above, but advantageously can be shaped angularly so along as it provides a uniform distribution of pressure of the liquid F along the width of the carrier W.

Figure 5:
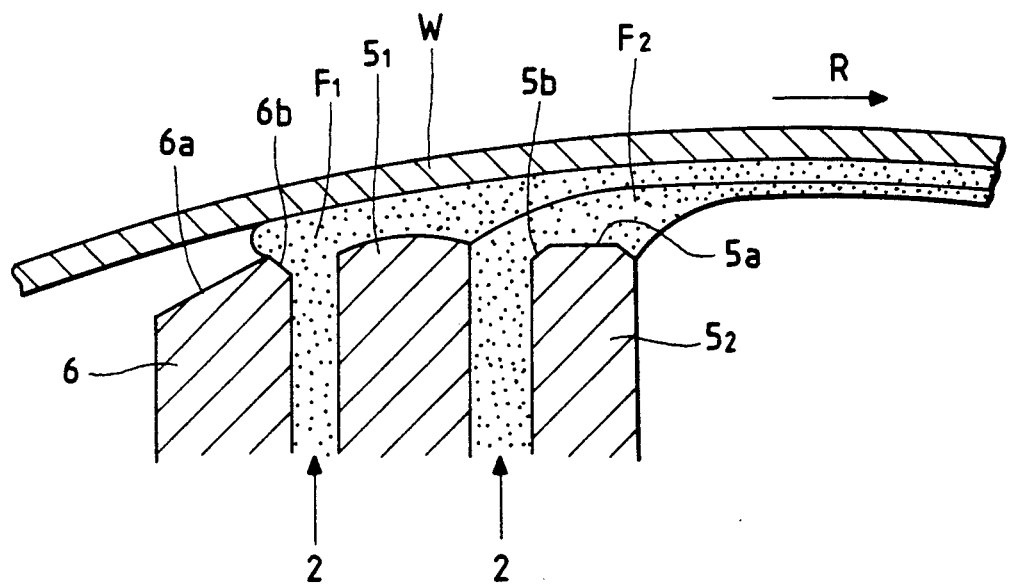
FIG. 5 is a sectional view of a major part of a double film applicator according to another embodiment of the present invention.
Figure 6:
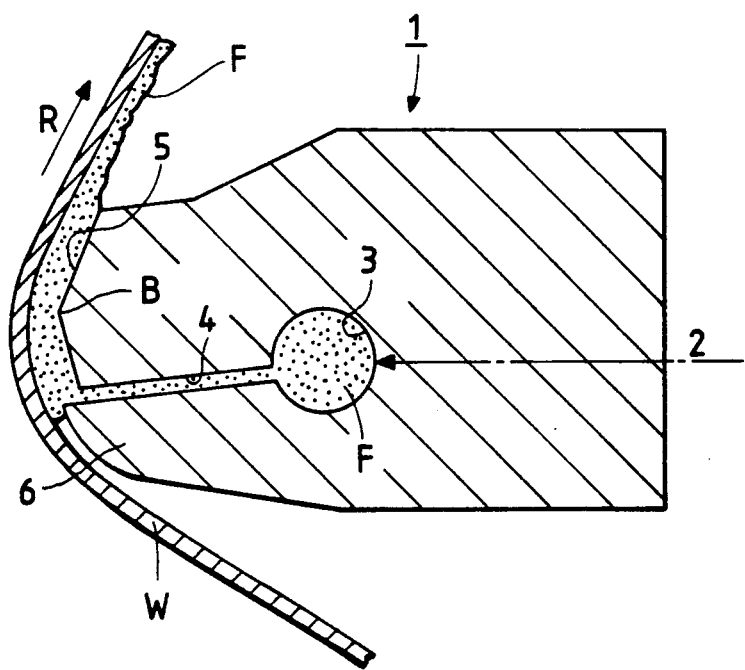
FIG. 6 is a sectional view of a conventional extrusion head.

Although applicator 1 is for applying the liquid F to the carrier W to make a single film thereon, the present invention is not confined thereto but may be embodied as an applicator for simultaneously applying a plurality of liquids to a carrier to make, for example, two films thereon as shown in FIG. 5. The applicator shown in FIG. 5 includes a back edge portion 6 having a chamfer 6b at the downstream edge of the carrier-facing surface 6a of the portion as well as the applicator shown in FIG. 1, and first and a second doctor edges, portions 51 and 52, respectively. The second doctor edge portion 52 for applying a liquid F2 to the carrier W to make an upper film has a chamfer 5b. Preferably, the first doctor edge portion 51, which is located upstream of the second doctor edge portion 52 with respect to the running direction of the carrier W and which applies the other liquid F1 to the carrier to make a lower film, does not have a chamfer.

An extrusion-type applicator provided in accordance with the present invention includes a doctor edge portion having a chamfer of relatively small width of 2 to 3 μm at the upstream edge of the carrier-facing surface of the portion, and a back edge portion having a chamfer which has a width larger than the diameter of each grain of the material of the portion and is located at the downstream edge of the carrier-facing surface of the portion. Since the doctor edge portion has the chamfer, a liquid which is applied by the device is not disturbed and the portion is not chipped Since the back edge portion has the chamfer whose width is larger than the diameter of each grain of the material of the portion, the properties of the surface of the portion at the chamfer are good enough to improve the contact thereof with the surface of the liquid without disturbing the behavior of the liquid. As a result, the entrainment of air into the liquid can be prevented by setting the pressure of the liquid at a high level appropriate for the rapid application of the liquid. The edge portions are unlikely to be chipped due to the high pressure of the liquid or the like. The edge portions of the device are thus prevented from being chipped or worn during application of the liquid, thus preventing deterioration of the applicator during operation of the device. Therefore, the applicator provides streak-free films of the applied liquid F on the carrier W during long periods of operation.

The objects, features and advantages of the present invention can be best understood by referring to actual examples of the embodiments thereof.

Substances shown in Table 1 were put in a ball mill so that the substances were well mixed and dispersed together. Then 30 parts by weight of an epoxy resin of 500 in epoxy equivalent were then added to the mixture and uniformly mixed and dispersed therewith to produce a magnetic liquid.

TABLE 1

| | |
|---|---|
| $\tau$-Fe$_2$O$_3$ powder (acicular grains of 0.5 | 300 parts by weight |

TABLE 1-continued

| | |
|---|---|
| μm in mean diameter along major axis and 320 oersted in coercive force) | |
| Copolymer of vinyl chloride and vinyl acetate (87:13 in copolymerization ratio and 400 in polymerization degree) | 30 parts by weight |
| Electroconductive Carbon | 20 parts by weight |
| Polyamide resin (300 in amine value) | 15 parts by weight |
| Lecithin | 6 parts by weight |
| Silicon oil (dimethyl polysiloxane) | 3 parts by weight |
| Xylol | 300 parts by weight |
| Methyl isobutyl ketone | 300 parts by weight |
| N-butanol | 100 parts by weight |

When the equilibrium viscosity of the magnetic liquid was measured by the shimadzu rheometer RM-1 manufactured by Shimadzu Corporation, the reading of the rheometer was 8 poise at the shearing speed of 10 per second and 1 poise at the shearing speed of 500 per second. The liquid was applied to a carrier by an extrusion-type applicator with factors described below. The carrier was a polyethylene terephthalate film of 20 μm in thickness and 300 mm in width. The tension of the carrier was set at 4 kg for the entire width thereof. The carrier was run at a speed of 300 m/min. Extrusion heads which were basically constructed as shown in FIG. 1 and had chamfers of different widths, and an extrusion head which was basically constructed as shown in FIG. 1 but did not have a chamfer were used for these applications. The extrusion heads were made of a very hard alloy having grains with mean diameters of about 5 μm. The thickness of the wet film of the applied magnetic liquid in the carrier was 10 μm.

Table 2 shows the results of the applications. After film application, the number of chip notches of each of the extrusion heads and the number of streaks on each of the films of the applied magnetic liquid were checked. It will be noted that for the extrusion head whose doctor edge portion had a chamfer of 50 μm in width and the extrusion head whose back edge portion had a chamfer of 150 μm in width, the surfaces of the films of the magnetic liquid applied by the heads were so bad that the surfaces could not be evaluated. The block "After Use" in Table 2 shows the number of chip notches of the extrusion head after the use thereof for 500 hours, and the number of the streaks on the film of the liquid applied by the head after that use. The signs O, Δ and X in the "General Evaluation" block of Table 2 mean that a chip notch and a streak were not made, namely, application was properly performed, that application was performed practically without any problem but was worse than that marked with the sign O and that a large number of chip notches and a large number of streaks were made, namely, application was not properly performed, respectively. "Nonuniform" in Table 2 means that the film of the applied magnetic liquid was slightly disturbed due to some cause which was not the chip notch.

TABLE 2

| Sample No. | Width of Chamfer | | Brand New | | After Use | | General Evaluation |
|---|---|---|---|---|---|---|---|
| | Back Edge Portion | Doctor Edge Portion | Chip Notch | Streak | Chip Notch | Streak | |
| 1 | None | None | 5 | 3 | 30 | 22 | X |
| 2 | None | 1μ | 5 | 2 | 20 | 15 | X |
| 3 | None | 3μ | 4 | 2 | 21 | 14 | X |
| 4 | None | 5μ | 3 | 1 | 19 | 17 | X |
| 5 | None | 10μ | 3 | 2 | 18 | 14 | Partly unapplicable |
| 6 | None | 50μ | 3 | — | 16 | — | Unapplicable |

TABLE 2-continued

| Sample No. | Width of Chamfer Back Edge Portion | Width of Chamfer Doctor Edge Portion | Brand New Chip Notch | Brand New Streak | After Use Chip Notch | After Use Streak | General Evaluation |
|---|---|---|---|---|---|---|---|
| 7 | 1μ | 1μ | 1 | 0 | 5 | 4 | Δ |
| 8 | 3μ | 1μ | 0 | 1 | 4 | 4 | Δ |
| 9 | | 2μ | 0 | 0 | 4 | 4 | Δ |
| 10 | | 3μ | 1 | 0 | 5 | 3 | Δ |
| 11 | | 4μ | 0 | 0 | 4 | 3 | Δ |
| 12 | 5μ | 1μ | 1 | 0 | 3 | 2 | Δ |
| 13 | | 2μ | 0 | 0 | 1 | 0 | ○ |
| 14 | | 3μ | 0 | 0 | 0 | 0 | ○ |
| 15 | | 4μ | 0 | 0 | 0 | 0 | Δ (nonuniform) |
| 16 | 10μ | 1μ | 0 | 0 | 2 | 1 | Δ |
| 17 | | 2μ | 0 | 0 | 1 | 0 | ○ |
| 18 | | 3μ | 0 | 0 | 0 | 0 | ○ |
| 19 | | 4μ | 0 | 0 | 0 | 0 | Δ (nonuniform) |
| 20 | 30μ | 1μ | 1 | 0 | 3 | 1 | Δ |
| 21 | | 2μ | 0 | 0 | 0 | 0 | ○ |
| 22 | | 3μ | 0 | 0 | 0 | 0 | ○ |
| 23 | | 4μ | 0 | 0 | 0 | 0 | Δ (nonuniform) |
| 24 | 50μ | 1μ | 1 | 0 | 2 | 1 | Δ |
| 25 | | 2μ | 0 | 0 | 0 | 0 | ○ |
| 26 | | 3μ | 0 | 0 | 0 | 0 | ○ |
| 27 | | 4μ | 0 | 0 | 0 | 0 | Δ (nonuniform) |
| 28 | 55μ | 1μ | 1 | 1 | 2 | 1 | Δ (nonuniform) |
| 29 | | 2μ | 0 | 0 | 0 | 0 | Δ (nonuniform) |
| 30 | | 3μ | 0 | 0 | 0 | 0 | Δ (nonuniform) |
| 31 | | 4μ | 0 | 0 | 0 | 0 | Δ (nonuniform) |
| 32 | 70μ | 3μ | 0 | 0 | 0 | 0 | X (thickness nonuniformity) |
| 33 | 100μ | 3μ | 0 | 0 | 0 | 0 | X (thickness nonuniformity) |
| 34 | 150μ | 3μ | 0 | — | 0 | — | nonuniformity) Air entrainment |

Two magnetic liquids were simultaneously applied to a carrier by an extrusion-type applicator with factors mentioned below, so that the liquids made two films on the carrier. The carrier was a polyethylene terephthalate film of 20 μm thick and 300 mm in width. The tension of the carrier was set at 4 kg for the entire width thereof. The carrier was run at a speed of 300 m/min. Extrusion heads which were basically constructed as shown in FIG. 5 and had chamfers of different widths, and an extrusion head which was basically constituted as shown in FIG. 5 and not having a chamfer were used for such applications. The radius of curvature of the carrier-facing surface of each of the first and second doctor edge portions of the extrusion heads was 6 mm. The heads were made of a very hard alloy having a mean grain diameter of 5 μm. The liquid F1 for making the lower film on the carrier was composed of substances shown in Table 3. The other liquid F2 for making the upper film on the lower one was composed of substances shown in Table 4. The applied quantities of the liquids F1 and F2 were 15 cc/m$^2$ and 10 cc/m$^2$, respectively. The liquids F1 and F2 were 0.2 poise and 0.3 poise in equilibrium viscosity at the shearing speed of $1 \times 10^4$ per second, respectively.

TABLE 3

| | |
|---|---|
| Carbon black (Cebalco of 250 μm in mean grain diameter) | 200 parts by weight |
| Nippolan 7304 manufactured by Nippon Polyurethan Industry Co., Ltd. | 80 parts by weight |

TABLE 3-continued

| | |
|---|---|
| Phenoxy resin (PKH-1) manufactured by Union Carbide Corp. | 35 parts by weight |
| Copper oleate | 1 part by weight |
| Methyl ethyl ketone | 500 parts by weight |

TABLE 4

| | |
|---|---|
| Cobalt-containing magnetic iron oxide (35 m$^2$ in $S_{BET}$ value) | 100 parts by weight |
| Polyurethane resin (Nippolan 2304 manufactured by Nippon Polyurethan Industry Co., Ltd.) | 8 parts by weight |
| Nitrocellulose | 10 parts by weight |
| Polyisocyanate | 8 parts by weight |
| Cr$_2$O$_5$ | 2 parts by weight |
| Carbon black (20 μm in means grain diameter) | 2 parts by weight |
| Stearic acid | 1 part by weight |
| Butyl stearate | 1 part by weight |
| Methyl ethyl ketone | 300 parts by weight |

Table 5 shows the results of the applications. The number of chip notches in each of the extrusion heads and the number of streaks made on each of the upper films were checked. As for the extrusion head whose doctor edge portion had the chamfer of 50 μm width and the extrusion head whose back edge portion had the chamfer of 150 μm in width, the surfaces of the films were so bad that the surfaces could not be evaluated, similar to that of the

TABLE 5

| Sample No. | Width of Chamfer Back Edge Portion | Width of Chamfer Doctor Edge Portion | Brand New Chip Notch | Brand New Streak | After Use Chip Notch | After Use Streak | General Evaluation |
|---|---|---|---|---|---|---|---|
| 1 | None | None | 6 | 3 | 30 | 25 | X |
| 2 | None | 1μ | 5 | 2 | 20 | 17 | X |
| 3 | None | 3μ | 4 | 2 | 21 | 14 | X |
| 4 | None | 5μ | 3 | 1 | 20 | 15 | X |
| 5 | None | 10μ | 3 | 2 | 18 | 13 | Partly unapplicable |

TABLE 5-continued

| Sample No. | Width of Chamfer Back Edge Portion | Width of Chamfer Doctor Edge Portion | Brand New Chip Notch | Brand New Streak | After Use Chip Notch | After Use Streak | General Evaluation |
|---|---|---|---|---|---|---|---|
| 6 | None | 50μ | 3 | — | 15 | — | Unapplicable |
| 7 | 1μ | 1μ | 1 | 0 | 6 | 5 | Δ |
| 8 | 3μ | 1μ | 0 | 1 | 5 | 4 | Δ |
| 9 | | 2μ | 0 | 0 | 4 | 4 | Δ |
| 10 | | 3μ | 1 | 0 | 5 | 3 | Δ |
| 11 | | 4μ | 0 | 0 | 4 | 3 | Δ |
| 12 | 5μ | 1μ | 2 | 0 | 3 | 2 | Δ |
| 13 | | 2μ | 0 | 0 | 1 | 0 | ○ |
| 14 | | 3μ | 0 | 0 | 0 | 0 | ○ |
| 15 | | 4μ | 0 | 0 | 0 | 0 | Δ (nonuniform) |
| 16 | 10μ | 1μ | 0 | 0 | 3 | 1 | Δ |
| 17 | | 2μ | 0 | 0 | 1 | 0 | ○ |
| 18 | | 3μ | 0 | 0 | 0 | 0 | ○ |
| 19 | | 4μ | 0 | 0 | 0 | 0 | Δ (nonuniform) |
| 20 | 30μ | 1μ | 1 | 0 | 3 | 1 | Δ |
| 21 | | 2μ | 0 | 0 | 0 | 0 | ○ |
| 22 | | 3μ | 0 | 0 | 0 | 0 | ○ |
| 23 | | 4μ | 0 | 0 | 0 | 0 | Δ (nonuniform) |
| 24 | 50μ | 1μ | 1 | 0 | 3 | 1 | Δ |
| 25 | | 2μ | 0 | 0 | 0 | 0 | ○ |
| 26 | | 3μ | 0 | 0 | 0 | 0 | ○ |
| 27 | | 4μ | 0 | 0 | 0 | 0 | Δ (nonuniform) |
| 28 | 55μ | 1μ | 1 | 0 | 2 | 2 | Δ (nonuniform) |
| 29 | | 2μ | 0 | 0 | 0 | 0 | Δ (nonuniform) |
| 30 | | 3μ | 0 | 0 | 0 | 0 | Δ (nonuniform) |
| 31 | | 4μ | 0 | 0 | 0 | 0 | Δ (nonuniform) |
| 32 | 70μ | 3μ | 0 | 0 | 0 | 0 | X (thickness nonuniformity) |
| 33 | 100μ | 3μ | 0 | 0 | 0 | 0 | X (thickness nonuniformity) |
| 34 | 150μ | 3μ | 0 | — | 0 | — | Air entrainment | previous example shown for Table 2. The signs O, Δ and X in the "General Evaluation" block of Table 5 mean that a chip notch and a streak were not made, namely, application was properly performed, that application was performed practically without any problem but was worse than that marked with the sign O, and that a large number of chip notches and a large number of streaks were made, namely, application was not properly performed, respectively. "Nonuniform" in Table 5 means that the film of the applied liquid was slightly disturbed due to some cause which was not the chip notch.

It will be appreciated from Tables 2 and 5 that application was very good, whether it was for making a single film of the liquid on the carrier or for simultaneously making two films of the liquids on the carrier, when the chamfer of the back edge portion was 5 to 50 μm in width and the chamfer of the doctor edge portion was 2 to 3 μm in width.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

WHAT IS CLAIMED IS:

1. An extrusion-type applicator device which continuously pushes out a liquid from the outlet portion of a slot to the surface of a flexible carrier being continuously run along the surface of a back edge portion and that of a doctor edge portion, so that said liquid is applied to said surface of said carrier, characterized in that:
   said doctor edge portion has a chamfer which is provided at the upstream edge of said surface of said doctor edge portion with respect to the running direction of said carrier and is 2 to 3 μm in width; and
   said back edge portion has a chamfer which is provided at the downstream edge of said surface of said back edge portion with respect to said direction and whose width is less than or equal to 50 μm and larger than the diameter of each grain of the material of said back edge portion.

2. An extrusion-type applicator device according to the claim 1, and capable of simultaneously applying liquids to a carrier so that said liquids make two films thereon, characterized in that the doctor edge portion applies a liquid to said carrier as an upper film on a lower film thereon and has the chamfer which is provided at the upstream edge of the surface of said doctor edge portion with respect to the running direction of said carrier and is 2 to 3 μm in width.

3. An extrusion-type applicator device for continuously applying a liquid to a carrier film moving with a predetermined linear velocity and having a predetermined running direction, said applicator device comprising:
   a head having a bore disposed substantially parallel to the longitudinal axis of said head for receiving the liquid;
   a slot operatively connecting said bore with a surface of said head opposing the carrier, said slot having opposing surfaces defining a substantially rectangular passage for said liquid;
   a back edge portion disposed adjacent to said slot on the upstream side of said slot with respect to said direction, said back edge portion having a chamfer whose width is less than or equal to about 50 μm and larger than the diameter of each grain of the material of said back edge portion; and
   a doctor edge portion disposed adjacent to said slot on the downstream side of said slot with respect to said direction, said doctor edge portion having a chamfer with a width of about 2 to 3 μm provided at the upstream edge of said surface of said doctor edge portion.

4. The applicator device of claim 3, wherein said applicator device simultaneously applies a plurality of liquids to a carrier to produce a plurality of films thereon, wherein said doctor edge portion applies a second liquid to said carrier as an upper film on a lower film thereon and has said chamfer with a width of about 2 to 3 μm provided at the upstream edge of the surface of said doctor edge portion with respect to said direction and wherein said applicator device further comprises a second slot disposed between said slot and said chamfer of said back edge portion.

5. The applicator device of claim 3, wherein said applicator device further comprises:
  a plurality of seal plates operatively connected to said head so as to close the opposing ends of said bore; and
  means operatively connected to said bore for supplying said liquid to said bore.

6. The applicator device of claim 5, wherein said means for supplying further comprises a positive displacement pump.

7. The applicator device of claim 5, wherein said means for supplying is operatively connected to at least one of said seal plates.

* * * * *